Patented Apr. 19, 1938

2,114,392

UNITED STATES PATENT OFFICE 2,114,392

PLASTICIZED PINE WOOD PITCH AND METHOD OF PRODUCING

Fred H. Lane, Hillsdale, N. Y., assignor to Hercules Powder Company, Wilmington, Del., a corporation of Delaware No Drawing. Application May 31, 1935,
Serial No. 24,356

9 Claims. (Cl. 134—26)

This invention relates to a plasticized pine wood pitch and to methods for producing the same.

Extracted pine wood pitch, which is complex resinous material whose exact composition is unknown, comprises the residue left after the separation of rosin, turpentine and other more valuable constituents of pine wood. It has been found to be a valuable resin for use in insulation, varnishes, and the like. However, a rather marked brittleness possessed by the extracted pine wood pitch has rendered it less valuable for many purposes than would otherwise be the case.

Extracted pine wood pitch, as has been indicated, is obtained in connection with the production of wood rosin from pine wood. The pine wood pitch will comprise a residue low in abietic acid remaining after the separation of refined rosin high in abietic acid from the resinous material obtained by extraction of pine wood with a solvent. It is characterized by substantial insolubility in cold petroleum hydrocarbons, but will differ somewhat in its specific characteristics, such as acid number, melting point, exact petroleum ether solubility and content of naphtha and toluol soluble matter, depending upon the method for the recovery of rosin from pine wood used in its production.

As is well known, rosin is extracted from pine wood by the use of a suitable solvent, such as hot gasoline, or benzol after steaming of the wood with live steam to remove volatile oils, such as turpentine and pine oil. Again, volatile oils, as turpentine, and pine oil, are extracted with the rosin without first steaming for their removal.

Following extraction the extract is distilled for the removal of solvent where the wood was subjected to steaming before extraction and for the removal of solvent and volatile oils, as turpentine and pine oil, where the wood was extracted directly without steaming. As the result of distillation a resinous material containing abietic acid and admixed impurities is obtained. This resinous material may be treated in any one of a number of ways, all known to the art, for the removal of refined rosin high in abietic acid. The residue remaining after the removal of refined rosin and comprising a dark colored, hard, resinous mass low in abietic acid constitutes the pine wood pitch.

The exact properties of the pine wood pitch obtained as indicated above will depend upon the method used for original extraction from the wood. When the wood is steamed before solvent extraction, a pine wood pitch is obtained having somewhat different properties from that obtained when the wood is extracted without steaming. Likewise the properties of pine wood pitch are somewhat different when obtained by different methods of purification of rosin. A comparison of the properties of three pine wood pitches is given in the following table, in which Pitch A is that obtained by extraction of wood with hot petroleum solvents subsequent to the removal of the volatile oils by steam distillation, refining with furfural, evaporation of the furfural and a final extraction of the residue with petroleum solvent to remove petroleum soluble matter. Pitch B is that obtained by a benzol extraction of unsteamed wood, evaporation of the benzol solution to a residue, extraction of the residue in hot low boiling petroleum solvent, precipitation of the Pitch B by washing with cold water, and then removal of this precipitate by filtration. Pitch C is obtained by the evaporation of the furfural layer, after refining of the gasoline solution of the crude resin obtained by the benzol extraction of pine wood.

| | Pitch A | Pitch B | Pitch C |
|---|---|---|---|
| Melting point (Hercules drop method) | 91° C. | 115° C. | 102° C. |
| Acid number | 100 | 105 | 116 |
| Unsaponifiable matter | | 5% | 8% |
| V. M. & P. naphtha insoluble | 89.5% | 96% | 83% |
| Toluol soluble | | 40% | 98% |
| Petroleum ether insoluble | 92.0% | 99% | 95% |
| Saponification number | | 169 | 140 |
| Ash | | .036% | .022% |

It is often desirable to subject the extracted pine wood pitch to a heat treatment at about 200°–250° C. to reduce a certain tendency to foam possessed by the untreated pitch. Such heat treatment will change the physical properties of the pine wood pitch to some extent. Thus, Pitch B when heat treated has the following characteristics:

Heat treated Pitch B

| | |
|---|---|
| Melting point (drop method) Degree C. | 120 |
| Acid number | 83 |
| Unsaponifiable matter Percent | 10 |
| V. M. & P. naphtha insoluble do | 97 |
| Toluol soluble do | 80 |
| Petroleum ether insoluble do | 99 |
| Saponification number | |
| Ash Percent | .040 |

As has been said, the extracted pine wood pitch suffers to some extent from a brittleness which interferes with its use in certain ways. Now in accordance with this invention it has been found that this brittleness may be greatly reduced or eliminated without sacrificing any of the valuable electrical and solubility characteristics of the pine wood pitch by admixing a natural glyceride, as an animal or vegetable oil, with the pine wood pitch.

The natural glyceride may be an animal or vegetable oil, as, for example, castor oil, polymerized castor oil, soya bean oil, cottonseed oil, China-wood oil, cocoanut oil, Perilla oil, olive oil, linseed oil, etc., and may be mixed with the extracted pine wood pitch in widely varying amounts, depending on the degree of flexibility or pliability desired and the use for which the plasticized product is intended. A range of from about 1% to about 70% oil may be cited as typical of the variation in oil content that may be used. While any natural glyceride may be used, the use of castor oil, either raw, blown, or polymerized, is preferred where the product is to be used in electrical insulation or will be exposed for long periods to the action of petroleum hydrocarbons.

The extracted pine wood pitch and the natural glyceride may be mixed and combined by dissolving them together in desired proportions in a volatile solvent, as, for example, ethyl alcohol, ester solvents, cyclic hydrocarbons, etc., with the use of heat if desired, and then evaporating the solvent. However, a preferred procedure is to combine and blend the oil and pine wood pitch by fusing the pine wood pitch at a temperature slightly above its melting point and then adding and thoroughly mixing with the fused pitch the desired amount of animal or vegetable oil. The mixture is then allowed to cool and is ready for use.

The following table shows the physical properties of various plasticized pine wood pitch products in accordance with this invention:

TABLE

|  | Ordinary castor oil with heat-treated pitch A | | | Pale blown castor oil with heat-treated pitch A | | |
| --- | --- | --- | --- | --- | --- | --- |
| Castor oil | 5% | 8% | 15% | 5% | 8% | 15% |
| Gasoline insoluble | 94.7 | 94.5 | 92.5 | 93.8 | 87.4 | 84.7 |
| Melting point | 107 | 109 | 105 | 106 | 109 | 97 |
|  | V. B. | V. B. | B. | V. B. | V. B. | B. |

*Polymerized castor oil fused together*

|  | Pitch A | | | | | |
| --- | --- | --- | --- | --- | --- | --- |
| Castor oil | 5% | 8% | 15% | 25% | 33% | 50% |
| Gasoline insoluble | 97.3 | 97.6 | 94.9 | 96.5 | 96.1 | 90.7 |
| Melting point | 107 | 105 | 98 | 87 | 85 | 74 |
|  | V. B. | V. B. | B. | P. | V. P. | S. |

|  | Heat-treated pitch A | | | | | |
| --- | --- | --- | --- | --- | --- | --- |
| Castor oil | 5% | 8% | 15% | 25% | 33% | 50% |
| Gasoline insoluble | 96.7 | 96.4 | 95.9 | 93 | 93 | 93 |
| Melting point | 112 | 111 | 111 | 93 | 90 | 83 |
|  | V. B. | V. B. | B. | P. | V. P. | S. |

*Polymerized castor oil blended in a solvent*

|  | Heat-treated pitch A | Pitch A | |
| --- | --- | --- | --- |
| Castor oil | 5% | 15% | 25% |
| Gasoline insoluble | 93 | 89 | 94 |
| Melting point | 119 | 101 | 93 |
|  | V. B. | B. | B. |

Notes:
S.—Denotes extremely soft, rubbery and sticky.
B.—Denotes brittle.
V. B.—Denotes very brittle.
P.—Denotes pliable and capable of being moulded with fingers.
V. P.—Denotes very pliable.

It is to be noted, however, that the ratings S., B., V. B., etc. are only comparative and represent the brittleness in the mass. Accordingly products marked "B." may well have sufficient pliability in a film form to be used in varnishes, etc.

Other pine wood pitches give substantially similar results when admixed with castor oil as those shown above for Pitch A. The results obtained by using other animal or vegetable oils in place of castor oil will also be similar, except the gasoline insolubility may not be so high.

It will be understood that the details and examples hereinbefore set forth are illustrative only, and are in no way in limitation of the invention as herein broadly described and claimed.

What I claim and desire to protect by Letters Patent is:

1. A plasticized product characterized by low solubility in petroleum hydrocarbons comprising a mixture of a natural glyceride and a petroleum hydrocarbon-insoluble resin obtained by first, extracting pine wood with a coal tar solvent, second, removing the volatile constituents from said extract and leaving a residual resin, then third, extracting from said residual resin and by means of a petroleum hydrocarbon solvent, the petroleum-soluble non-volatile constituents of said residual resin.

2. A plasticized product characterized by low solubility in petroleum hydrocarbons comprising a mixture of a vegetable oil and a petroleum hydrocarbon-insoluble resin obtained by first, extracting pine wood with a coal tar solvent, second, removing the volatile constituents from said extract and leaving a residual resin, then third, extracting from said residual resin and by means of a petroleum hydrocarbon solvent, the petroleum-soluble non-volatile constituents of said residual resin.

3. A plasticized product characterized by low solubility in petroleum hydrocarbons comprising a mixture of a castor oil and a petroleum hydrocarbon-insoluble resin obtained by first, extracting pine wood with a coal tar solvent, second, removing the volatile constituents from said extract and leaving a residual resin, then third, extracting from said residual resin and by means of a petroleum hydrocarbon solvent, the petroleum-soluble non-volatile constituents of said residual resin.

4. A plasticized product characterized by low solubility in petroleum hydrocarbons consisting of between about 1% and 70% of a natural glyceride in a mixture of a natural glyceride and a petroleum hydrocarbon-insoluble resin obtained by first, extracting pine wood with a coal tar solvent, second, removing the volatile constituents from said extract and leaving a residual resin, then third, extracting from said residual resin and by means of a petroleum hydrocarbon solvent, the petroleum-soluble non-volatile constituents of said residual resin.

5. A plasticized product characterized by low solubility in petroleum hydrocarbons consisting of between about 1% and 70% of a vegetable oil in a mixture of a vegetable oil and a petroleum hydrocarbon-insoluble resin obtained by first, extracting pine wood with a coal tar solvent, second, removing the volatile constituents from said extract and leaving a residual resin, then third, extracting from said residual resin and by means of a petroleum hydrocarbon solvent, the petroleum-soluble non-volatile constituents of said residual resin.

6. A plasticized product characterized by low solubility in petroleum hydrocarbons consisting of between about 1% and 70% of castor oil in a mixture of castor oil and a petroleum hydrocarbon-insoluble resin obtained by first, extracting pine wood with a coal tar solvent, second, removing the volatile constituents from said extract and leaving a residual resin, then third, extracting from said residual resin and by means of a petroleum hydrocarbon solvent, the petroleum-soluble non-volatile constituents of said residual resin.

7. The method of producing a plasticized product characterized by low solubility in petroleum hydrocarbons which comprises mixing a natural glyceride, in amounts between about 1% and 70% of the mixture, with a petroleum hydrocarbon-insoluble resin obtained by first, extracting pine wood with a coal tar solvent, second, removing the volatile constituents from said extract and leaving a residual resin, then third, extracting from said residual resin and by means of a petroleum hydrocarbon solvent, the petroleum-soluble non-volatile constituents of said residual resin.

8. The method of producing a plasticized product characterized by low solubility in petroleum hydrocarbons which comprises mixing a natural glyceride, in amounts between about 1% and 70% of the mixture, with a petroleum hydrocarbon-insoluble resin obtained by first, extracting pine wood with a coal tar solvent, second, removing the volatile constituents from said extract and leaving a residual resin, then third, extracting from said residual resin and by means of a petroleum hydrocarbon solvent, the petroleum-soluble non-volatile constituents of said residual resin, the admixture being effected by fusing the said resin, mixing the glyceride with the fused resin and thereafter cooling the mixture.

9. The method of producing a plasticized product characterized by low solubility in petroleum hydrocarbons which comprises mixing a natural glyceride, in amounts between about 1% and 70% of the mixture, with a petroleum hydrocarbon-insoluble resin obtained by first, extracting pine wood with a coal tar solvent, second, removing the volatile constituents from said extract and leaving a residual resin, then third, extracting from said residual resin and by means of a petroleum hydrocarbon solvent, the petroleum-soluble non-volatile constituents of said residual resin, the admixture being effected by dissolving the said resin and the natural glyceride in a voluble solvent and then evaporating the solvent.

FRED H. LANE.